(12) United States Patent
Matassa et al.

(10) Patent No.: US 12,485,400 B2
(45) Date of Patent: Dec. 2, 2025

(54) DEVICE AND METHOD FOR CONVERTING AND SEPARATING AT LEAST ONE REACTANT AND A REACTION PRODUCT THEREOF

(71) Applicant: VITO NV, Mol (BE)

(72) Inventors: Claudia Matassa, Mol (BE); Helmut Elslander, Mol (BE); Dominic Ormerod, Mol (BE); Yamini Satyawali, Mol (BE)

(73) Assignee: VITO NV, Mol (BE)

( * ) Notice: Subject to any disclaimer, the term of this patent is extended or adjusted under 35 U.S.C. 154(b) by 1143 days.

(21) Appl. No.: 17/358,977

(22) PCT Filed: Dec. 27, 2019

(86) PCT No.: PCT/EP2019/087071
§ 371 (c)(1),
(2) Date: Jun. 25, 2021

(87) PCT Pub. No.: WO2020/136236
PCT Pub. Date: Jul. 2, 2020

(65) Prior Publication Data
US 2023/0149880 A1    May 18, 2023

(30) Foreign Application Priority Data
Dec. 27, 2018    (EP) .................................... 18248092

(51) Int. Cl.
*B01J 14/00* (2006.01)
*B01D 11/04* (2006.01)
(Continued)

(52) U.S. Cl.
CPC ......... *B01J 14/005* (2013.01); *B01D 11/0457* (2013.01); *B01D 11/0476* (2013.01);
(Continued)

(58) Field of Classification Search
CPC ............ B01D 11/0457; B01D 11/0476; B01D 11/0492; B01D 11/04; B01D 11/00;
(Continued)

(56) References Cited

U.S. PATENT DOCUMENTS

2013/0315803 A1\* 11/2013 Liu .................... B01D 11/0457
422/258

FOREIGN PATENT DOCUMENTS

| CN | 1324795 A | 12/2001 |
|---|---|---|
| CN | 101309748 A | 11/2008 |

(Continued)

OTHER PUBLICATIONS

TW 201231136 A English description, Aug. 1, 2012, Shen Zhen-Feng et al.\*
(Continued)

*Primary Examiner* — Akash K Varma
(74) *Attorney, Agent, or Firm* — Banner & Witcoff, Ltd.

(57) ABSTRACT

A method and a device are disclosed for converting at least one reactant into a reaction product and separating the at least one reactant. The device includes a vessel with a vessel inner volume and a confinement, submerged in the vessel inner volume, that provides a confinement inner volume in fluid connection with the vessel inner volume. First and seconds fluids, with a respective, higher first density and a lower, second density form respective lower and upper phases in the vessel inner volume. A third fluid with a third density higher than that of the second fluid forms a lower layer in the confinement inner volume, relative to an upper layer formed by the second fluid. The third fluid may be the same as or different from, and is physically separated from, the first fluid. At least one of the first, second, and third fluids is at most partly miscible with the other two, but preferably immiscible. The at least one reactant and the reaction (Continued)

product have different affinities for at least two of the first, second, and third fluids, and at least one of the first and third fluid contains a fourth phase which is a solid or semi solid and is capable of promoting the conversion.

25 Claims, 4 Drawing Sheets

(51) Int. Cl.
    *B01D 17/02* (2006.01)
    *B01F 27/90* (2022.01)
    *B01F 29/83* (2022.01)
    *B01J 19/00* (2006.01)
    *B01J 19/18* (2006.01)
    *C01B 35/10* (2006.01)
    *C07C 209/88* (2006.01)
    *C12P 13/00* (2006.01)

(52) U.S. Cl.
    CPC ...... *B01D 11/0492* (2013.01); *B01D 17/0214* (2013.01); *B01F 27/90* (2022.01); *B01F 29/83* (2022.01); *B01J 19/0066* (2013.01); *B01J 19/18* (2013.01); *C01B 35/109* (2013.01); *C07C 209/88* (2013.01); *C12P 13/001* (2013.01)

(58) Field of Classification Search
    CPC ............ B01D 11/0446; B01D 17/0214; B01D 17/0208; B01D 17/02; B01J 14/005; B01J 14/00; B01J 19/0066; B01J 19/18; B01J 19/00; B01J 8/005; B01J 8/008; B01J 8/10; B01J 8/00; B01F 29/83; B01F 27/90; C01B 35/109; C01B 35/10; C07C 209/88; C12P 13/001; C12P 13/00; C12P 41/00; G01N 1/40; G01N 2001/4061
    USPC ........................................................ 210/663
    See application file for complete search history.

(56) References Cited

FOREIGN PATENT DOCUMENTS

| | | | |
|---|---|---|---|
| CN | 101991971 B | 6/2012 | |
| CN | 107921395 A | 4/2018 | |
| TW | 201231136 A | * 8/2012 | ............ B01D 11/00 |

OTHER PUBLICATIONS

Satyawali Yamini et al: "Asymmetric synthesis of chiral amine in organic solvent andin-situproduct recovery for process intensification: A case study" Biochemical Engineering Journal, Elsevier, Amsterdam, NL, vol. 117, Nov. 9, 2016.

Lima Afonso Neto W et al: "Process Considerations for the Asymmetric Synthesis of Chiral Amines using- Transaminase" Ph. D. Thesis, Technical University of Denmark, Department of Chemical and Biochemical Engineering; Aug. 1, 2013.

Soren Heintz et al: "Development of in-situ product removal strategies in biocatalysis applying scaled-down unit operations : Miniature Unit Operations for ISPR Level" Biotechnology and Bioengineering, vol. 114, No. 3, Oct. 12, 2016.

International Search Report and Written Opinion—PCT/EP2019/087071—mailing date Mar. 30, 2020.

* cited by examiner

DEVICE AND METHOD FOR CONVERTING AND SEPARATING AT LEAST ONE REACTANT AND A REACTION PRODUCT THEREOF

CROSS-REFERENCE TO RELATED APPLICATIONS

This application is a U.S. National Stage application under 35 U.S.C. § 371 of International Application PCT/EP2019/087071 (published as WO 2020/136236 A1), filed Dec. 27, 2019, which claims the benefit of priority to Application EP 18248092.1, filed Dec. 27, 2018. Benefit of the filing date of these prior applications is hereby claimed. Each of these prior applications is hereby incorporated by reference in its entirety.

The invention relates to a method and a device for converting at least one reactant into a reaction product and separating the at least one reactant from the reaction product, using a multi-phase system, according to the preamble of the first claim.

Three-phase liquid-liquid-liquid extraction (TLPE) is nowadays considered a very promising method for the separation of multi-component mixtures. This novel and easy technique takes advantage of the differences in physicochemical properties of three coexisted phases thus providing a variety of possibilities for improvement of liquid extraction processes (He et al., 2012). In contrast to the conventional liquid-liquid two-phase extraction (solvent extraction), which requires many steps to separate a multi-component system into its components and wherein each step extraction targets only one compound, TLPE allows achieving multi-phase liquid separation of two or more components of a multi-component mixture in a one-step extraction.

TLPE is often combining the traditional organic-water solvent extraction and polymer-based aqueous biphasic extraction. The systems are usually composed of and organic solvent-rich top phase, a polymer rich middle phase and a salt-rich bottom phase, which should be immiscible according to Chinese patent publication ZL00107655.8. Through the application of different diluents, extractants and aqueous phase conditions, this technique can be adapted to handle a wide variety of solutes. Many potential applications of TLPE have been investigated such as environmental wastewater and multi-metal solution treatment, bio-chemicals purification and/or separation, extraction of natural products and preparation of ultrafine powder.

Besides traditional solvent extraction apparatus such as mixer-settler, extraction column (or tower) and centrifugal extractor, recently the use of mixer-settler-mixer three chamber integrated extraction unit has been explored (He et al., 2012) in US2013/0315803.

These known devices provide methods for separating components of a solution by utilizing an unequal distribution of the components between two or three immiscible liquid phases. It is essential that the fluids are immiscible and capable of rapidly separating after being mixed together, and this is primarily a function of the difference in densities between the three phases.

The constantly expanding field of bio catalysis is in search of novel biocatalyst and process intensification strategies to meet its needs. Enzymes are multifunctional catalysts that allow to perform many chemical processes under mild conditions. Moreover, they often exhibit higher chemo-, regio- and enantioselectivity over conventional metal catalysts for production of fine chemicals, flavors, fragrances, agrochemicals and pharmaceuticals. In the case of enzymatic reactions, the selection of a proper solvent system is crucial for the stability and selectivity of the enzyme and its substrates and reaction products. Solvents for enzymatic reactions are generally aqueous or organic solvents, water-water miscible or water-water immiscible systems. Supercritical fluids, anhydrous media, reversed micelles, solvent-free systems, gas phases, fluorinated solvents and ionic liquids may however be used as well.

Aqueous solutions are undoubtedly natural media for enzymes. However, enzyme catalysis in non-aqueous media is gaining more and more attention due to the poor solubility of many compounds, including substrates as well as reaction products in water, the difficulties of product recovery, the often unfavorable thermodynamic equilibrium of many processes in water, and the water induced side reactions. Although the conventional believe that most enzymes are less active and unstable in the presence of organic solvents, enzymes can also be active in organic solvents with little or no water. Although in the absence of water an enzyme may have the tendency to denature, it does not have the flexibility to do so. Consequently, various crystalline enzymes essentially retain their native structures even in anhydrous organic solvents. As a result, non-aqueous media have replaced water in many biotechnological processes including synthesis of chiral molecules, modified fats and oils, specialty pharmaceuticals, food additives, flavor esters, biopolymers, peptides, and proteins.

Apart from the media in which the reaction is taking place, enzymes can catalyze reactions as individual molecules dissolved in solution or they can be physically confined or localized in a certain defined region of space. The latter case is defined as immobilization strategy. In some cases, enzyme immobilization greatly improved enzyme performances in terms of activity and stability of the biocatalysts. Moreover, being immobilized, enzyme reuse can enhance the economy of an industrial process. Spinning reactors are an example of an immobilization strategy for enzymes in enzymatic reactions. Spinchem has developed a reactor with the enzyme positioned in a separate reactor compartment, separated from the surrounding reaction medium by a permeable separator, which ascertains contact with the surrounding reaction medium. Representative examples of spinning reactors are the rotating bed reactors commercially available from Spinchem. In the Spinchem systems the enzyme is immobilized in a confinement which forms a rotating bed and contains a side wall providing g filters that allow the liquid reaction medium to pass through. That way, the enzyme present in the confinement is in full contact with the surrounding reaction medium in the reactor. Devices of this type are for example disclosed in US2016/023739.

The device disclosed in US2016/023739 comprises a mainly cylindrically shaped flow distributor with a lower and an upper surface, a liquid permeable peripheral wall, an inlet for receiving a liquid phase which contains the starting material for the reaction, and an outlet on the peripheral wall for discharging reaction product. The flow distributor may be rotated and/or oscillated. The reaction medium inside the flow distributor is in fluid contact with the surrounding reaction medium in the transformation device, and the reaction medium inside the reactor compartment and in the surrounding reaction medium are the same.

However, in order to push the often unfavorable the thermodynamic equilibrium to the product side, strategies aiming to selective product removal (in situ product recovery strategies) may be required. Furthermore, selective coproduct removal or substrate dosing strategies may be needed in case of enzymes co-product or substrate inhibited systems. Evidently, the Spinchem design doesn't meet the requirements for the selective separation of the reaction compounds.

Hyungdon YUN and Byung-Gee KIM in Biosci. Biotechnol. Biochem., 72 (11), 3030-3033, 2008 disclose the enzymatic synthesis of(S)-α-MBA with acetophenone and alanine. To overcome product inhibition by(S)-α-MBA, use was made of a solvent-bridge reaction system, comprising a first reactor which contained the reaction solution and a second reactor which contained the extraction solution. The first and second reactor are connected to each other by a solvent bridge, which contains an organic solvent. This process allows the(S)-α-MBA produced in the reaction solution to move continuously into the extraction solution through the organic solvent. Alanine and pyruvate stayed in reaction solution due to their ionization states TW201231136 discloses a liquid phase extraction apparatus, comprising (1) a first container for containing the sample liquid, a liquid organic phase and a stir bar;
(2) a second container housed in the first container. The second container contains a liquid receiving phase. The second container is in fluid communication with the receiving phase in the first container through a body opening at a position above the level of the receiving phase;
(3) a tube member is received in the second container, in fluid communication therewith.

The tube member with the second container containing the receiving phase are placed into the first container with the opening positioned below the organic phase level. The organic phase flows into the second container through the opening to come into contact with the receiving phase. After the extraction is completed, the receiving phase can be taken out from the tube member.

There is thus a need for a device and a method which permit to control the distribution of one or more chemical compounds contained in a fluidic mixture among the liquid phases in a multiple liquid extraction, in which two of the solvents may be miscible.

The present invention therefore aims at providing a device with which the distribution of one or more chemical compounds contained in a fluidic mixture among the liquid phases in a multiple liquid extraction may be improved.

This is achieved according to the present invention with a device for converting at least one reactant into a reaction product and separating the at least one reactant from the reaction product, wherein the device comprises a vessel with a vessel inner volume and a confinement submerged in the vessel inner volume, the confinement providing a confinement inner volume which is in fluid connection with the vessel inner volume, wherein the vessel inner volume contains a first fluid with a first density $\rho 1$ and a second fluid with a second density $\rho 2$, with $\rho 1 > \rho 2$, so that the first fluid forms a lower phase and the second fluid forms an upper phase in the vessel inner volume, wherein the confinement contains a third fluid with a third density $\rho 3$ with $\rho 3 > \rho 2$ so that the second fluid forms an upper layer and the third fluid forms a lower layer in the confinement inner volume, wherein the third fluid may be the same as or different from and is physically separated from the first fluid, wherein at least one of the first, second fluid and third fluid is immiscible with the other two, wherein the at least one reactant and the reaction product have a different affinity for at least two of the first, second and third fluid, wherein at least one of the first and third fluid contain a fourth phase which is a solid or semi solid and is selected from the group of materials capable of promoting the conversion of the at least one reactant into the reaction product.

With a semi solid is meant a phase which has a higher viscosity than the first respectively the third fluid, wherein the semi solid may for example be a gel or the like.

The device of this invention is suitable for use with a process which involves on the one hand the conversion of at least one reactant into at least one reaction product, and on the other hand the separation of the at least one reactant from the reaction product. Using this three phase system the at least one reactant can be converted into the at least one reaction product, and the at least one reactant and/or the at least one reaction product can be separated from each other. After the separation has been accomplished, the at least one reactant and/or the at least one reaction product may be recovered from the liquid or phase containing the at least one reactant and/or the at least one reaction product. The present invention presents the advantage that one single system which employs a three phase system suffices to achieve reactant conversion and separation of the reaction product from the reactant. The invention is therefore suitable for use with complex multi target mixtures.

The device of this invention is particularly suitable for carrying out reactions, where at least one reactant is supplied to or contained in one of the fluids, and the at least one reaction product may be recovered, separated or isolated simultaneously from another fluid while the reaction is still going on. Generally, the at least one reactant may be contained in or supplied to at least one of the first and second fluid or the third fluid.

The device of this invention is particularly suitable for use with reactions in which the thermodynamic equilibrium may be or needs to be shifted to the product side, by removal or recovery of the reaction product from the fluid in which the conversion is taking place. At least one of the fluids may be selected such that it has a higher affinity for the reaction product than the other fluids, so that the reaction product will selectively move to that fluid and may be recovered therefrom. In the device of this invention typically, the equilibrium of a reaction may be forced to the product side by supplying an excess of a reactant to one of the fluids and/or preferably continuous removal of the reaction product from another fluid. The first, second and third fluid are selected such that the at least one reactant has a different affinity for at least two of the first, second and third fluid, the at least one reaction product has a different affinity for at least two of the first, second and third fluid, and the at least one reactant and the at least one reaction product have a different affinity for at least two of the first, second and third fluid.

In general, the first, second and third fluid will be selected in such a way that the at least one reactant has a higher affinity for one of the first, second fluid and third fluid, and that the at least one reaction product has a higher affinity for another of the first, second fluid and third liquid. As a result, the reactant and at least one reaction product will tend to accumulate in different fluids based on their affinity for those fluids, and they may be separated from each other even in case the first and third fluid would be miscible which each other because the first and third fluid are physically separated in the device.

The at least one reactant may be supplied to one of the fluids, but is preferably supplied to the fluid containing the fourth phase to facilitate the contact between the at least one reactant and the fourth phase and accelerate the reaction. The at least one reactant may however also be supplied to one of the other fluids, for example the second fluid, and move from there towards the fourth phase. In a preferred embodiment the at least one reactant is supplied in excess to one of the fluids.

In the prior art, recovering of the reaction product of a reaction carried out by transaminase enzymes, was typically carried out using membrane in situ product recovery (ISPR) strategies (Bö et al., 2015; Rehn et al., 2016, 2014). This technique may however be associated with the simultaneous extraction of the amine donor into the aqueous phase which also contains the reaction product, which is unwanted (Satyawali et al., 2017). Expressed differently, the membrane used in the ISPR step is not always sufficiently selective towards a desired product and may involve inclusion of reactants in the reaction product being recovered. In that case further downstream processing steps may be required to separate the reactants or any other products from the reaction product. Moreover, this kind of processes is often only suitable for batchwise operation. The present invention presents the advantage that the third or first fluid, i.e. the fluid not in contact with the fourth phase, may be selected such that they show a high affinity for the reaction product, and thereby support accumulation of the reaction product therein.

In the device of this invention, generally two of the three fluids, in particular the first and third fluid do not contact each other and those fluids may be the same or different, they may be at most partly miscible with each other, but preferably have a limited miscibility, and more preferably they are immiscible. The first, second and third fluid may be selected by the skilled person taking into account the nature of the at least one reactant which is subjected to a conversion, and the nature of the at least one reaction product which is to be recovered. The fact that these two fluids are physically separated a.o. by a further fluid, makes the system suitable for use as a reaction system, where reactants may be contained in or supplied to one fluid, and the reaction product may be recovered from another fluid.

Because the confinement inner volume is in fluid connection with the second fluid in the vessel inner volume, by the presence of the third fluid, a space is created in both the inner volume of the reaction vessel and in the inner volume of the confinement which is suitable for receiving a further fourth phase and in which a chemical or biochemical reaction may be carried out. The fourth phase may be selected from a wide variety of functional materials, for example it may be selected from the group of a catalyst or an immobilized biological entity capable of transforming reactants, for example an enzyme or a mixture of two or more enzymes.

As such the fourth phase may be a solid material, a semi-solid material, a gel, a thickened liquid phase or any other form considered suitable by the skilled person. The first or third fluid then form a protective layer for and on top of the fourth phase and thereby ensure that the fourth phase is restricted to the bottom of the inner vessel volume or the inner confinement volume. As a result, the device of this invention is particularly suitable for use with enzymatic reactions, wherein the enzyme may be used as such and must not be supported by a carrier.

The present invention thus provides a device or a system which relies on a three phase separation, wherein a fourth phase contained in either the first or third fluid is isolated from the other two fluids contained in the device. The at least one reactant and the at least one reaction product may move to the fluid for which they have the highest affinity.

In a preferred embodiment, transport of the at least one reactant and the at least one reaction product, may be supported by the agitation provided, to permit recovering of the reaction product from that one of the remaining fluids.

In a typical example of an enzymatic reaction, the fourth phase may comprise an enzyme and the first and third fluid will at most be partly miscible, but preferably immiscible, with the second fluid. The second fluid will usually be an organic solvent capable of carrying the substrate to be converted by the enzyme. The third fluid may be an organic solvent as well, or an organic solvent mixed with water, or a water based solution. Similarly, the first fluid may be an organic solvent as well, or an organic solvent mixed with water, or a water based solution. Depending on whether the enzyme is positioned on the bottom of the vessel or on the bottom of the confinement, the enzymatic reaction may take place in the first fluid in the vessel or in the third fluid in the confinement, where the enzyme at the bottom is surrounded by a protective layer of the third fluid on the top of the enzyme. Enzyme is therefore covered and 'protected' by either the first or the third fluid.

The present invention takes advantage of differences in physicochemical properties of at least two of the three coexisting fluids to achieve multi-phase liquid separation of two or more compounds in a one-step extraction, which provides a variety of possibilities for improvement of liquid extraction processes. The inner volume of the confinement is in fluid connection with only one of the two fluids contained in the vessel inner volume, either the second or first fluid depending on the position of the confinement in the vessel inner volume and the amount of first and second fluid present in the vessel inner volume.

The device here presented, permits improving the selectivity with which the reaction product may be recovered to a level that extends beyond the selectivity obtainable with the usual water-oil liquid-liquid systems and aqueous-two-phase systems, because the liquid phases with a wide range of polarities and chemical properties to suit different purposes. In contrast to the conventional three-liquid-phase extraction system (TES) composed of an organic solvent-rich top phase, a polymer-rich middle phase and a salt-rich bottom phase (He et al., 2012), being physically separated, in the present invention two out of three phases can be miscible with each other. Therefore the present invention provides an additional degree of freedom when compared to TES described in literature.

According to a preferred embodiment of the invention, the first and third fluid are at most partly miscible, but preferably they have a limited miscibility and more preferably are immiscible to facilitate phase separation and improve reaction product recovery.

The fourth phase may either be positioned on a bottom of the vessel or a bottom of the confinement, the skilled person will be able to select the optimal position taking into account the nature of the at least one reactant, the at least one reaction product and the reaction carried out.

In order to achieve an effective separation of the first, second and third fluid, the confinement preferably comprises a liquid impermeable confinement wall.

The fourth phase may be selected from a wide variety of materials, in particular from the group of biologically active materials such as cells or fragments thereof, an enzyme or a mixture of two or more enzymes, freeze dried cells containing one or more enzymes, etc. The fourth phase may also be a catalytically active material capable of promoting a chemical reaction, such as a catalyst, a catalyst comprising a catalytically active material supported on a carrier material or a combination hereof. The biologically active materials and the catalytically active materials may be immobilized on a carrier or not. The fourth phase may be positioned either on the bottom of the confinement or on the bottom of the vessel.

In a preferred embodiment, the fourth phase may further comprise one or more materials selected from the group of a stationary phase capable of carrying out separations according to the principles of chromatography, sorbents for the selective trapping of one or more agents transported by the fluidic flow, a porous or non-porous solid reagent carrier, a reagent carrier containing covalently or non-covalently bonded reagent(s), trapped liquid(s) or gas(es), immobilized chemical reagents, scavengers, reaction supports, trapping sorbents or a combination or two or more hereof.

According to other preferred embodiments, the at least one reactant is contained in or supplied to the first fluid, and one or more of the second and third fluid contain a compatibilizer for improving the compatibility of the at least one reaction product with the second and/or third fluid to improve recovery of the reaction product therefrom. According to alternative preferred embodiments, the at least one reactant is contained in or supplied to the third fluid, and the first or the second fluid contain a compatibilizer for improving the compatibility of the reaction product with the first or the second fluid. The skilled person will be capable of selecting an appropriate additive, as many of them are generally known. Examples of suitable compatibilisers include a solubiliser for improving the solubility of the at least one reactant or the at least one reaction product. Suitable solubilisers include pH buffers for controlling the pH at a desired value, compatibilisers, compounds controlling the polarity of a solution, salts, complexing agents, chelating agents for example EDTA, compounds reactive with the reaction product to carry out reactive extraction, counter-ions, compounds with desired polarity, hydrophilicity or hydrophobicity, salts for example N, N methyl- or N,N tricoctyl ammoniumchloride.

According to further alternative embodiments, a mixture containing a substrate in a reaction solvent may be contained in or supplied to the second fluid, with the purpose of dissolving therein and diffusing towards the first or the third fluid. The chemical reaction may then occur at the interphase of the first and second fluid or at the interphase of the second and third fluid. The reaction product may be extracted into the second fluid and transported into the first fluid due to partitioning, induced by the agitation and based on the affinity of the reaction product which is better for the first fluid than for the second fluid.

In order to facilitate diffusion of a substrate or one or more reactants supplied to the second solvent, the device of the present invention is provided with means for agitating at least one of the first, second and third fluid. Agitation of one of the fluids may suffice, as movement induced in one of the fluids, may impart movement towards the remaining fluids. The agitation means may be selected amongst those generally known to the skilled person, for example amongst means provided for rotating, rocking, wagging, or oscillating the confinement. The reactant, the at least one reaction product and the remainder of the mixture will in general diffuse into the fluid or phase for which they show the highest affinity, as a result of mass transfer induced by agitation, and independently of other compounds contained in the fluidic mixture. As a result, compounds may be separated from each other and from a fluidic mixture at relatively high purity, with minimum risk to the simultaneous separation of the fluid present in the fluid mixture containing them or any similar products, for example unwanted side products of a reaction.

In a practical arrangement, the agitating means and the confinement are connected to an upright extending motion shaft of the device. Moving of the shaft will therefore cause the confinement to move and impart motion to the first and second fluid. Depending on the nature of the agitation, movement will also be imparted to the third phase, to a larger or lesser extent.

In order to minimise the risk to agitating the fourth solid or semi solid phase, agitation preferably is smooth and arranged in such a way that motion is imparted to the liquid or fluid phases in a way that mass transfer is supported without however causing the fluids to mix, whereas moving of the solid fourth phase is limited to a minimum to keep the fourth phase in place and minimise the risk of moving of e.g. a catalyst into the second and/or first fluid.

In order to ensure a sufficient degree of motion over the entire fluid contained in the inner vessel volume, the motion shaft is preferably provided with a first set of impellers, at a position outside of and proximal to the bottom of the confinement. The motion shaft may further be provided with a second set of impellers at a position proximal to an open top face of the confinement and below an upper surface of the second fluid.

In a preferred embodiment, the confinement comprises a bottom and a peripheral wall which are liquid impermeable, and a top face which is at least partly open and capable of communicating with the vessel inner volume.

The device of the present invention may provide an alternative to the use of perfluorinated solvents for recovering the reaction product. The applications of those solvents remained indeed limited mainly for cost reasons and environmental aspects, as they risk to have an adverse effect on the ozone layer.

The present invention also relates to a method for converting at least one reactant into at least one reaction product and separating the at least one reactant from the at least one reaction product, wherein the method comprises the steps of
feeding the at least one reactant to one or more of a first, second or third fluid contained in a vessel with a vessel inner volume into which a confinement is submerged, the confinement providing a confinement inner volume in fluid connection with the vessel inner volume, wherein the first fluid has a first density $\rho 1$ and the second fluid has a second density $\rho 2$, with $\rho 1 > \rho 2$, wherein the first fluid is at most partly miscible with the second fluid so that the first fluid forms a lower phase and the second fluid forms an upper phase in the vessel inner volume, wherein the vessel inner volume is at most partly filled with the second fluid in fluid connection with the confinement inner volume, wherein the confinement contains the third fluid with a third density $\rho 3$, wherein $\rho 3 > \rho 2$ so that the second fluid forms an upper layer and the third fluid forms a lower layer in the confinement inner volume, wherein the third fluid may be the same as or different from the first fluid, wherein at least one of the first, second fluid and third fluid is immiscible with the other two,
wherein at least one of the first and third fluid contain a fourth phase which is a solid or semi solid and is selected from the group of materials capable of promoting the conversion of the at least one reactant into the reaction product,
wherein the at least one reactant and the at least one reaction product have a different affinity for at least two of the first, second and third fluid.

Thereby, one or more of the first, second and third fluid are preferably subjected to agitation carried out in such a way that mass transfer between the first, second and third fluid is promoted, while mixing of the first, second and third fluid is reduced to a minimum.

The present invention is further illustrated in the detailed description below, in the appending figures and description thereof.

Figure 1:
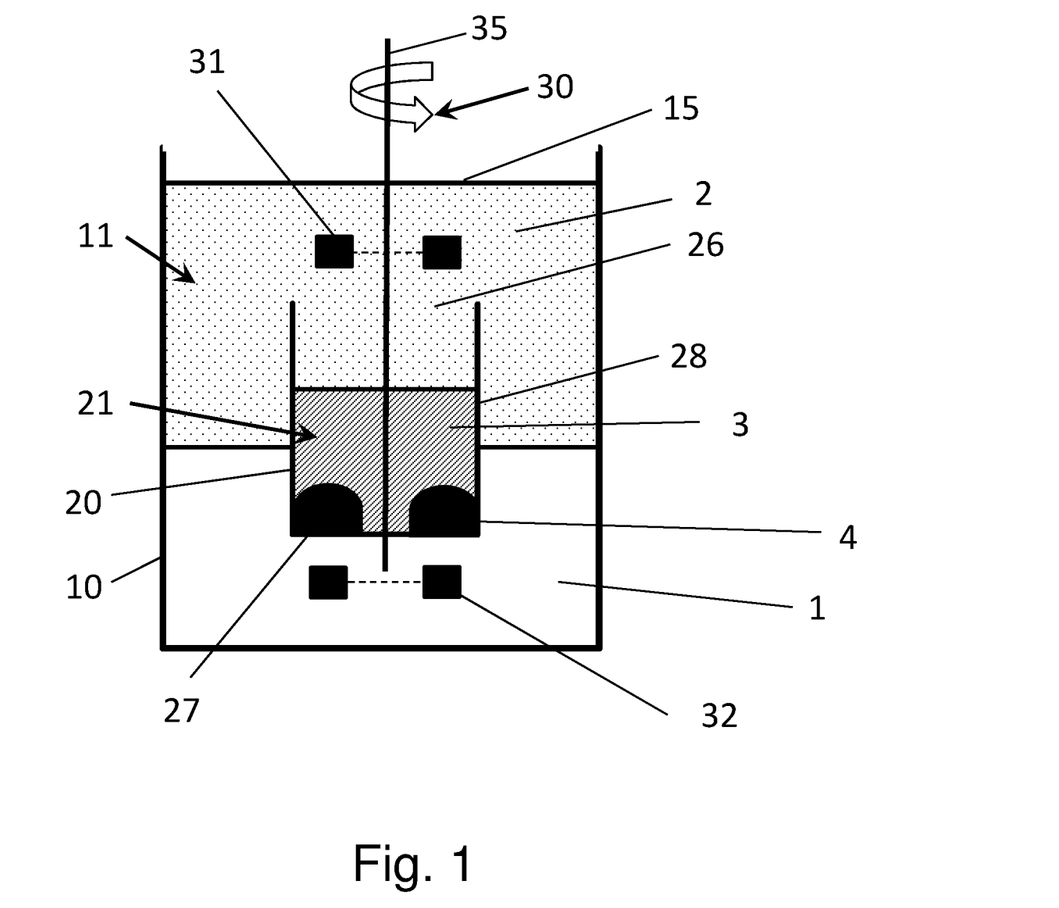
FIG. 1 shows a schematic representation of a preferred embodiment of a device of the present invention.
Figure 2:
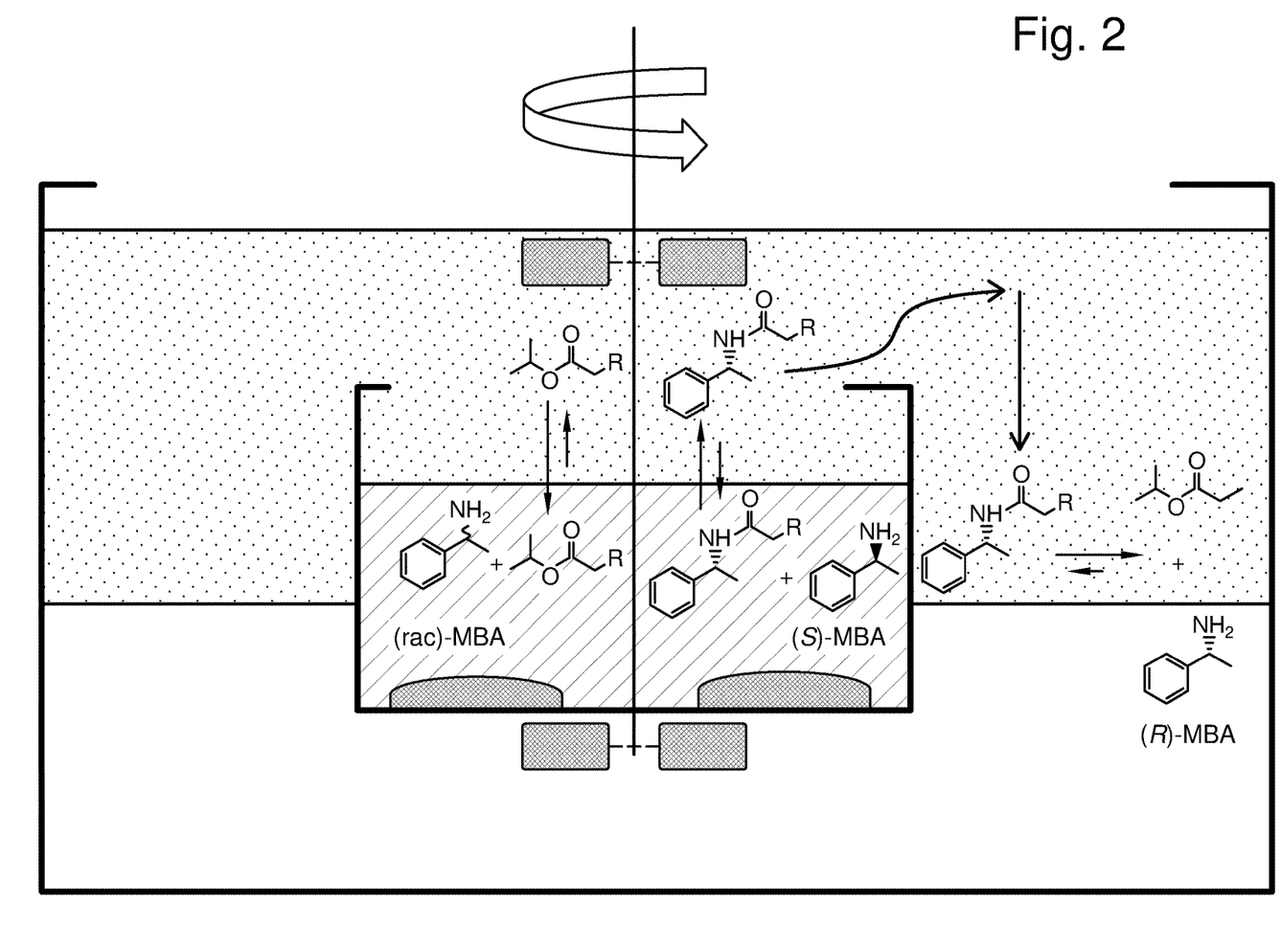
FIG. 2 shows a schematic representation of the reactions occurring in example 4.

As can be seen from FIGS. 1 and 2, the device of the present invention comprises a vessel 10 with a vessel inner volume 11. In the vessel inner volume 11 a confinement 20 is positioned, which in turn comprises an inner confinement volume 21 surrounded by a confinement peripheral wall 28. The inner confinement further comprises a bottom 27, and an upper face 26 which is at least partly open, but which in a preferred embodiment may be fully open. As a result, the confinement inner volume 21 is in fluid connection with the vessel inner volume 11 along its upper face 26 only. The vessel inner volume 11 is at least partly filled with fluid 1, 2, 3, the confinement 20 is submerged therein. Vessel 10 may contain one single confinement 20. The confinement may take any position in the vessel inner volume 11, but preferably it is positioned centrally in the vessel inner volume 11 in crosswise direction of the vessel inner volume. Alternatively, two or more confinements 20 may be provided, which may be positioned adjacently in the vessel inner volume 11 at a distance from each other, either according to a geometrically regular pattern or not. In the case where two or more confinements 20 are present, the two or more confinements may be shifted with respect to each other in height direction of the vessel 10 or they may be positioned at the same height.

In the vessel inner volume, means 30 may be provided for imparting motion to at least one of the first, second and third fluid contained in the vessel inner volume. Motion is understood to comprise many ways known to the skilled person of subjecting one or more of the first, second and third fluid phase to motion, for example to rotation, vibration, shaking, flow, wagging, rocking, oscillating or any other type of motion considered suitable by the skilled person, or combinations hereof. The means for imparting motion may be arranged to impart motion to one of the first, second or third fluid only, or to two or more hereof.

The means for imparting motion are preferably designed in such a way that mass transfer between adjacent fluids 1, 2 in the vessel inner volume 11 is promoted and diffusion of chemical compounds between the first and second fluid 1, 2 is promoted. Motion may cause the first and second fluid to be mixed to a certain degree, but motion is preferably done in such a way that mass transfer of one or more chemical compounds from one fluid to another is promoted while the mixing of adjacent fluids is limited. Similarly, the means for imparting motion are preferably designed in such a way that mass transfer between adjacent fluids 2, 3 in the confinement inner volume 21 and mass transfer between the second fluid 2 and third phase 3 is promoted. Motion may cause the third and second fluid to be mixed to a certain degree, but preferably the mixing is limited. This way for example, mass transfer or diffusion of a reactant supplied to the second fluid 2 towards the third phase 3 which contains a catalyst for catalysing the conversion of the reactant to a desired reaction product, may be promoted. Additionally, transfer or diffusion of the desired reaction product from the third phase into the second fluid towards the first fluid may be promoted as well, so that isolation of the desired reaction product is facilitated.

According to a preferred embodiment of this invention, the means for imparting motion comprise an upright extending axis 35 of the vessel 10, which may be subjected to a.o. rotation, vibration, rocking, etc. According to a further preferred embodiment of the invention as shown in FIGS. 1 and 2, the confinement 20 may be mounted to the upright axis 35. In a preferred embodiment, motion is understood to comprise rotation of the confinement 10, by rotating the axis 35. Thereby the angular velocity may vary or may be set at a constant value. Means for imparting rotation are well known from the prior art, and may for example comprise a direct mechanical connection of the axis to an external actuator, or an indirect coupling to an external force field, for example a ferromagnetic element present in the device which is actuated by a fluctuating external magnetic field.

Separation performance of the at least one reactant and at least one reaction product can be controlled by various parameters, and may for example be controlled by varying the motion speed of the at least one confinement, the position the confinement in the vessel inner volume, the size of the confinement or a combination of two or more hereof. Therefore, the position of the confinement 20 in the vessel inner volume 11 may either be fixed or be variable, in particular in height direction of the vessel inner volume and axis 35. Varying the position of the confinement 20 will in particular permit changing the working volume of the third fluid contained in the confinement inner volume 21, but it will also permit changing the working volume of the first and second fluid. Separation performance may further be improved by the presence of one or more materials capable of selective trapping the at least one reactant or the at least one reaction product, and combinations of two or more of such materials.

The motion shaft 35 or axis may be provided with additional motion imparting members, such as one or more impellers 31, 32 or any equivalent means known to the skilled person. The motion shaft 35 may comprise a first set of impellers 31, at a position outside of the confinement 20 and proximal to the bottom 27 of the confinement. The motion shaft 35 may be provided with a further second set of impellers 32 at a position proximal to an open top face 26 of the confinement and below an upper surface 15 of the second fluid. If so desired, additional impellers may be provided at a position considered suitable by the skilled person. Separation performance can be controlled by varying the rotation speed, and the position, size and numbers of the impellers. Moreover, the position of the confinement inside the vessel inner volume can be easily changed depending on the envisaged working volumes of each phase.

The vessel inner volume 11 contains a first fluid 1 with a first density $\rho 1$, and a second fluid 2 with a second density $\rho 2$, wherein $\rho 1 > \rho 2$. The first and second fluid are selected such that the first fluid 1 is at most partly miscible with the second fluid 2 so that the first fluid 1 forms a lower phase and the second fluid 2 forms an upper phase in the vessel inner volume 11. Preferably however, the first and second fluid 1, 2 are immiscible.

The confinement is submerged in the vessel inner volume in such a way that the second fluid 2 contained in the confinement inner volume 21 is in fluid connection with the second fluid 2 in the vessel inner volume 11, along the at least partly open upper face of the confinement 20. The confinement may be positioned such that its inner volume 21 is partly filled with the second fluid 2 and partly with a third fluid 3, or fully filled with third fluid 3. In the confinement inner volume, a third fluid is contained with a third density $\rho 3$, wherein $\rho 3 > \rho 2$ so that the second fluid 2 forms an upper layer on top of the third fluid 3, which forms a lower layer in the confinement inner volume 21. The position of the confinement in the vessel inner volume 11, and the amount of first and second fluid in the vessel inner volume will determine the amount of third fluid 3 and second fluid 2 contained in the confinement inner volume 21.

The third fluid 3 may contain a third fluid 3, which is selected such that it is at most partly miscible with, preferably immiscible with the second fluid 2. The third fluid may be the same as or may be different from the first fluid 1. The first fluid 1 may be a liquid, or a mixture of two or more liquids, or it may have one or more solids or one or more reactants dissolved or dispersed therein. The second fluid 2 may also be a liquid, or a mixture of two or more liquids, or it may have one or more solids or one or more reactants dissolved or dispersed therein. The third fluid 3 may be a third liquid, or a mixture of two or more liquids, or it may have one or more solids or one or more reactants dissolved or dispersed therein. With miscible is meant that the two fluids may be mixed in all proportions that is, to fully dissolve in each other at any concentration, and form a homogeneous solution in all proportions. With two fluids being immiscible is meant that there are certain proportions in which the mixture of the two fluids does not form a solution.

In a preferred embodiment, the third fluid 3 contains a fourth phase 4, in particular a fourth solid member. The solid member 4 can comprise a wide variety of types of materials, for example immobilized biologically active materials such as cells or fragments thereof, a catalyst capable of promoting a chemical reaction, a stationary phase that can carry out separations according to the principles of chromatography, a sorbent that can effectuate selective trapping of one or more agents transported by the fluidic flow, a porous or non-porous solid reagent carrier, or a porous or non-porous solid reaction support, where the reagent carrier or reaction support may contain covalently or non-covalently bonded reagent(s), trapped liquid(s) or gas(es), an immobilized chemical reagent, catalyst, scavenger, reaction support, or trapping sorbent, or immobilized biological materials such as cells or fragments thereof or any other material that is capable of reacting with at least one reactant comprised in the first fluid.

The confinement 20 may house within its inner confinement volume 21, fourth phase or solid or semi solid member 4. The third fluid 3 will usually serve to protect or isolate the fourth phase 4 from the second fluid 2. In an embodiment it is however also possible that the solid member 4 is housed in inner vessel volume 11.

The confinement can further be equipped with means for providing exchange of energy, heating, cooling, introduction of acoustic energy, or application of electromagnetic radiation or microwave radiation, designed to be connected with one or more reaction confinement(s).

Either the vessel 10 or the confinement 20 or both can further be equipped with means for exchanging matter such as supplying or feeding of one or more reactants and/or removal of products or by-products. This will permit to provide the conditions for carrying out a specific desired biological or chemical reaction, or to control, accelerate, or delay a biological or chemical reaction. In an example, means may be provided for supplying a reactant to the confinement inner volume 21, and for removing first fluid 1 containing one or more reaction products from the vessel inner volume 22. Means may also be provided to replenish first fluid 1 and to remove second fluid 2 or third fluid 3.

In a preferred embodiment, a supply member may be provided for supplying the mixture containing two or more compounds to be separated from each other either to the first, the second or the third fluid 1, 2, 3. Preferably however, the supply member is arranged for supplying the mixture containing two or more compounds to be separated from each other to the second fluid 2. According to a further preferred embodiment a withdrawer 50 may be provided for withdrawing a desired reaction product 55 from the first fluid 1 or from the third fluid 3, but preferably from the first fluid 1. Batchwise withdrawal or withdrawal in the continuous mode may be provided.

The device and method of this invention may be exploited either in continuous mode or batchwise.

According to a preferred embodiment, the supply member is provided for supplying the at least one reactants to the second fluid 2. According to a further preferred embodiment a withdrawer 50 may be provided for withdrawing a desired reaction product obtained from the conversion of the at least one reactant in the confinement from the first fluid 1, or from the third fluid in case the reaction proceeds in the third fluid 3.

According to a still further preferred embodiment, at least one compound is at least one reactant and is contained in the third fluid, for example in the third fluid 3, converted into a reaction product and the reaction product may be recovered from the first fluid.

As conversion of the at least one reactant is carried out in one of the fluids, and since at least one of the fluids is selected such that a reaction product obtained by the conversion of the at least one reactant shows a higher affinity for another one of the fluids, simultaneous conversion of the at least one reactant and recovery of the reaction product may take place. This is of particular importance where the reaction product acts as an inhibitor of the reaction, as continuous removal of the reaction product may be carried out, which will drive the equilibrium of the reaction towards the reaction product. Similarly, this may be of particular importance where a co-product or side product of the reaction acts as an inhibitor of the reaction, and continuous removal of the coproduct or side product may be carried out. An example hereof is the conversion of a fatty acid and an alcohol to an ester, wherein water produced as a byproduct acts as an inhibitor for the esterification reaction and water removal may shift the thermodynamic equilibrium towards desired end product.

As can be understood from the above, the confinement 20 is suitable for carrying out a wide variety of reactions or separations, for example biological or chemical reactions, or physical or chemical trapping.

The device of the present invention is particularly suitable for use with heterogeneous processes in chemistry and biotechnology wherein a solid member contacts a fluidic medium which contains reactants or other agents, sample solutes, and/or reaction products resulting from the interactive processing of the agents contained in the fluidic medium with the solid member(s). The convective flow provided by the device of this invention ensures the mass transfer between the first and second fluid, necessary to accomplish the reaction.

A method of this invention comprises the steps of feeding a mixture comprising one or more reactants to a vessel 10 with a vessel inner volume 11 and a confinement 20 submerged in the vessel inner volume 11, the confinement 20 providing a confinement inner 21 volume as described above, with a bottom 27 and a peripheral wall 28 which are liquid impermeable and with an upper face 26 which is at least partly open so that the confinement inner volume 21 is in fluid connection with the vessel inner volume 11. The vessel inner volume 11 contains a first fluid 1 with a first density $\rho1$, and a second fluid with a second density $\rho2$, wherein $\rho1>\rho2$ and the first and second fluid 1, 2 are at most partly miscible but are preferably so that the first fluid 1 forms a lower phase and the second fluid 2 forms an upper phase in the vessel inner volume 11. The confinement inner volume 21 is partly filled with the second fluid 2 which is in fluid connection with the second fluid 2 in the vessel inner volume 11. The confinement further contains a third fluid 3 with a third density $\rho3$, wherein $\rho3>\rho2$ so that the second fluid forms an upper layer and the third fluid forms a lower layer in the confinement inner volume 21. The second and third fluid 2, 3 are at most partly miscible but are preferably immiscible.

In a first preferred embodiment of this method where isolation of one or more compounds from a complex mixture containing several dissolved compounds is envisaged, the first and second fluid 1, 2 and the third fluid 3 are selected such that a first compound 5 to be recovered has an affinity for the second fluid 2 which is lower than an affinity for the first fluid 1, whereas the affinity of the remainder of the complex solution for the third fluid 3 is higher than for the second fluid 2. After the complex solution has been supplied to the second fluid 2, and motion has been imparted to the content of the vessel, compound 5 will tend to move into fluid 1 from which it can be recovered. If needed or desired, fluid 1 may comprise a compatibilizer for improving the compatibility of the compound and the first fluid. Because of the affinity differences, the method of this invention permits isolating one or more compounds from a complex mixture while simultaneously limiting the risk to entraining of other compounds and/or solvent from the complex mixture.

In an alternative to this first preferred embodiment, the first and second fluid and the third fluid are selected such that the compound 5 has an affinity for the second fluid 2 which is lower than an affinity for the third fluid 3, and the remainder of the mixture has a higher affinity for the first fluid. After having been supplied to the second fluid, and having imparted motion to the content of the vessel, compound 5 will tend to diffuse into third fluid 3 from which it can be recovered. If needed or desired, third fluid 3 may comprise a compatibilizer for improving the compatibility of the compound and third fluid 3.

According to a still further alternative, a first compound 5 to be recovered has an affinity for the second fluid 2 which is lower than an affinity for the first fluid 1, a second compound may have an affinity for the third fluid 3 which is higher than for the second fluid 2 and the first fluid 1 whereas the affinity of the remainder of the complex solution for the second fluid 2 is higher than for the first and third fluid. This will permit separation of a first and second compound from the complex mixture, thereby limiting the risk to entraining of further compounds from the mixture.

It shall be clear that many permutations of the above are possible.

In a second embodiment where conversion of a compound 5 contained in the mixture is envisaged, for example conversion of a reactant into one or more reaction products, the second fluid 2 and third fluid 3 may be selected such that compound 5 has an affinity for the second fluid 2 which is lower than an affinity for the third fluid 3. Third fluid 3 comprises a fourth phase 4, for example a catalyst or an enzyme or similar, for catalyzing the conversion of compound 5 into one or more desired reaction products. After having been supplied to the second fluid, and having imparted motion to the content of the vessel, compound 5 will tend to diffuse into third fluid 3, where it contacts the catalyst or enzyme and is converted into a desired reaction product. Third fluid 3 will in this case be selected such that the affinity of the one or more reaction products for third fluid 3 is lower than that for second fluid 2, which in turn will be lower than the affinity for fluid 1. Motion imparted to the system, will support mass transfer from the third fluid, through the second fluid and towards the first fluid. The one or more reaction products may then be recovered from first fluid 1. In order to control reaction product affinity, first fluid 1 may contain a compatibilizer, or a compatibilizer may be supplied to first fluid 1.

According to an alternative embodiment, the third fluid contains the reactant 5 that is to be converted into a desired reaction product. Motion imparted to the content of the vessel 10, will support contact between reactant 5 and catalyst or biocatalyst 4, and cause the reaction product to diffuse into second fluid 2 after which it may then be recovered from first fluid1, because of a better compatibility with fluid 1. In order to control reaction product affinity, first fluid 1 may contain a compatibilizer, or a compatibilizer may be supplied to first fluid 1.

It shall be clear that many permutations of the above are possible.

Compatibilizers are generally known to the skilled person and may for example comprise a solvent with a certain polarity, hydrophilicity or a pH buffer.

The invention is further elucidated in the examples below.

EXAMPLE 1

Extraction of 1-Methyl 3-Phenyl Propyl Chiral Amine (MPPA)

Figure 3:
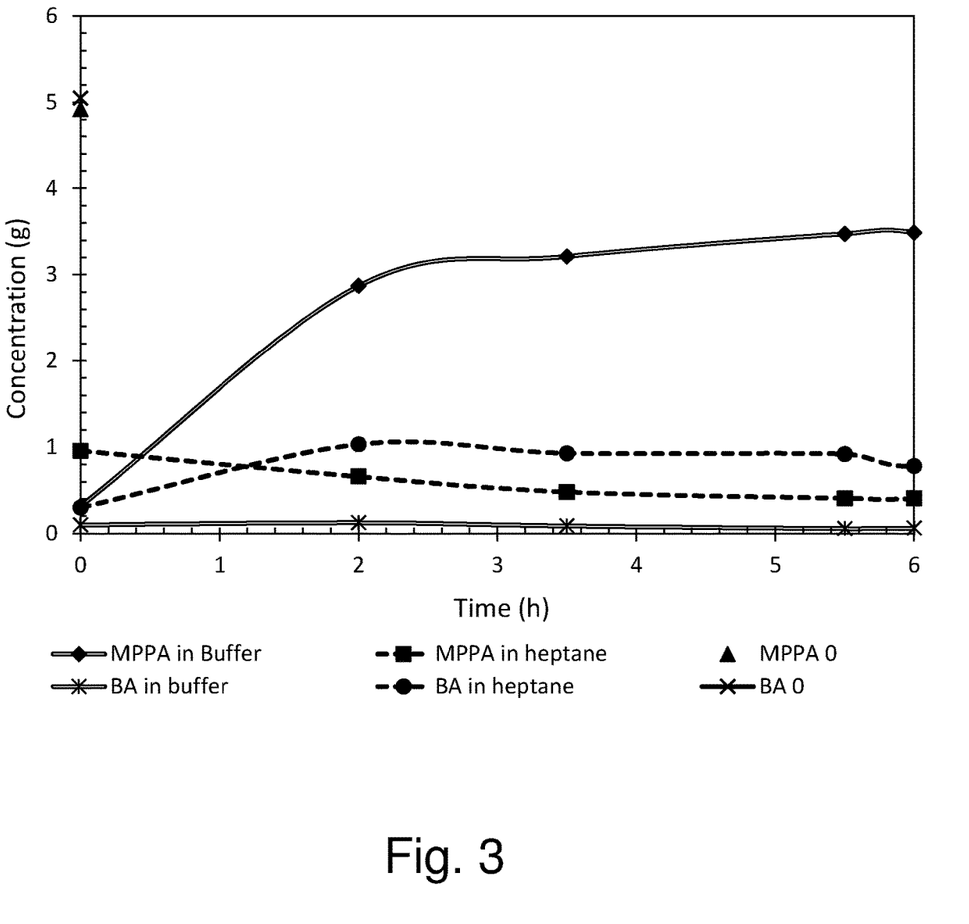
FIG. 3 shows in example 1, the evolution of the concentration of reactant BA and reaction product MPPA in the reactant mixture, and in the extracting buffer.

The apparatus of the present invention was applied to investigate the behavior of benzyl acetone (BA) and MPPA chiral amine in the three liquid phase system composed by O,O'-Bis(2-aminopropyl) polypropylene glycol-block-polyethylene glycol-block-polypropylene glycol (PEG-C), n-heptane and citric acid buffer solution. The hydrophobic organic solvent heptane (683 kg/m3), which has a smaller density than both the aqueous citric acid and the PEG-C hydrophilic solutions, is immiscible and stays above the PEG and the citric acid buffer solutions. The experiment was conducted filling the inner tubular confinement (20), which is fixed to the agitator shaft with a solution of PEG-C. The volume of the PEG solution (third solution) amounted to 28 mL. The bottom of the vessel was first filled with 220 mL of acidic buffer (first solution) and then with 920 mL of heptane (containing 5 g of BA and 5 g of MPPA). The heptane solution was therefore in fluid contact with both PEG and citric acid buffer solutions but the miscible latter mentioned phases were physically separated by the inner tubular confinement (20). During the extraction, the content of BA and MPPA and PEG were analyzed and determined in both heptane and buffer phases. As shown in FIG. 3, MPPA progressively accumulated into the buffer extracting phase. After 5 hours of operation, the buffer resulted enriched with an MPPA extraction rate of 71% while the content of PEG was very low (9.7%). BA was not detected in the acid buffer phase. The heptane middle phases resulted BA enriched (20%) (FIG. 3). The remaining BA was found in the PEG solution, in the inner tubular confinement volume.

EXAMPLE 2

Transamination Reaction for Chiral Amine Synthesis with Simultaneous In Situ Product Recovery (ISPR)

Figure 4:
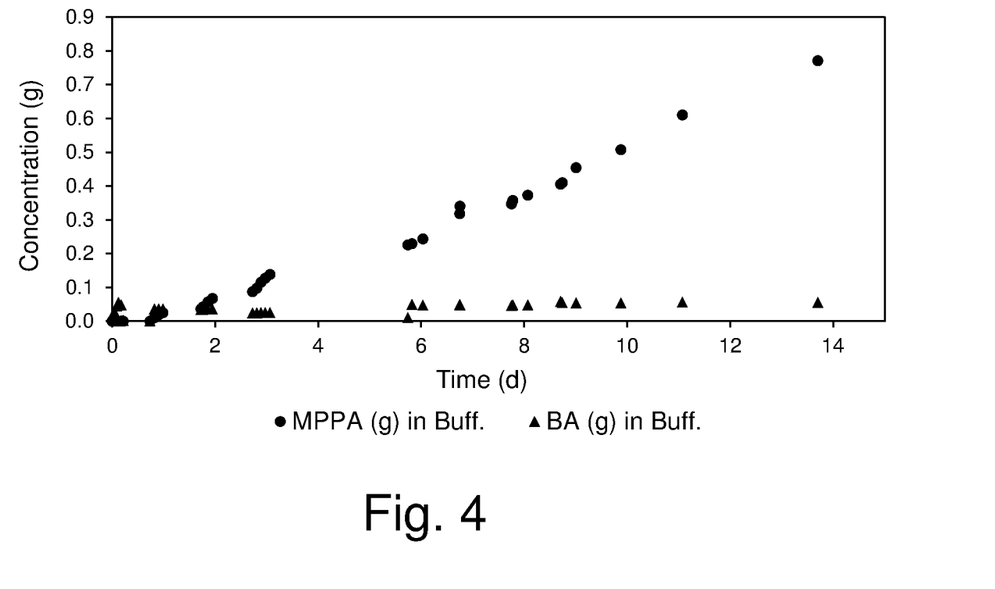
FIG. 4 shows in example 2, the evolution of the concentration of reactant BA and reaction product MPPA in the extracting buffer as the conversion of BA into MPPA proceeds.
Figure 5:
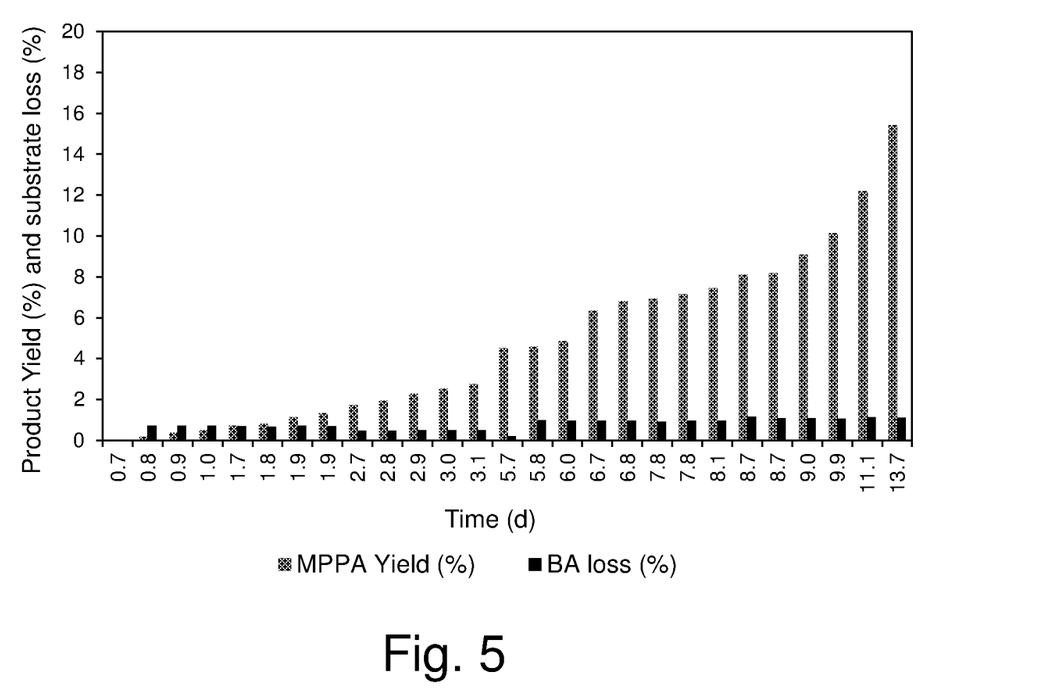
FIG. 5 shows in example 2, the evolution of the reaction product yield (MPPA yield), and the loss of reactant BA into the extracting buffer as a function of reaction time.

The apparatus of the present invention can be applied to perform the synthesis and ISPR of MPPA chiral amine (one step process) in the three liquid phase system composed by PEG-C, n-heptane and citric acid buffer solution. The hydrophobic organic solvent heptane (683 kg/m3), which has a smaller density than both the aqueous citric acid and the PEG-C hydrophilic solutions, is immiscible and stays above the PEG and the citric acid buffer solutions. The enzymatic takes place in the confinement inner volume. Here the enzyme, placed at the bottom, is surrounded by PEG C (polyethylene glycol high molecular weight amine donor). Being heavier and insoluble in heptane, PEG-C would preferentially form a layer on the top of the enzyme thus restricting the enzyme to the bottom of the inner tubular cylinder of the spinning reactor. Enzyme is therefore covered and 'protected' by the PEG layer. The ketone substrate BA (originally dissolved in n-heptane) binds or diffuses from heptane into the PEG C layer. The enzymatic reaction either occurs at the PEG C layer or at the enzyme-PEG C interphase. As soon as the product amine MPPA is formed, it is extracted into the citric acid buffer (aqueous solution) via travelling through n-heptane due to partitioning. In 17 days, 0.8 g of MPPA was formed, extracted and therefore isolated into the citric acid buffer (FIG. 4). This corresponds to a MPPA product yield value of 15% (FIG. 5). A very low amount of unreacted BA substrate was co-extracted in the citric acid buffer during the entire test (FIG. 4 and FIG. 5).

EXAMPLE 3

Extraction of Boric Acid Derivatives from Suzuki Reaction

In another example, related to a transition metal catalyzed reaction, the first fluid comprises an aqueous phase, the third fluid comprises a low polarity solvent, e.g. ethyl acetate, that captures the catalyst and the second fluid comprises a conventional solvent e.g. n-heptane for the product/reagents. Because the solubility of reagents/products is likely to be low in a low polarity solvent such as ethyl acetate, then concentration of reagents/products will be low in this phase so maybe it could be used for macro-cyclisations even perhaps semi continuous.

In such reaction, the chemical catalyst will be positioned inside the confinement and be covered by PEG. The idea is that the catalyst has ligands so that it forms hydrogen with the PEG layer. Above PEG layer there will be the non-PEG miscible solvent (not n-heptane but another) and the extraction layer at the bottom is aqueous (first fluid). This type of set-up can be used to extract boric acid derivatives from Suzuki reaction.

EXAMPLE 4

Synthesis and Separation of Both (R)- and (S)-Amine or Alcohol Enantiomers

The use of our device would allow to combine enzymatic kinetic resolution reactions with the subsequent de-acylation and separation steps required for the synthesis and separation of (R)- and (S)-amine and alcohol enantiomers. Depending upon the affinity of the substrates, the enzymatic kinetic resolution of one enantiomer could occur in the first fluid or in the third fluid. Assuming that the reaction occurs in the first fluid, also called source phase, such fluid could be water or an organic solvent such as methanol or toluene. A lipase could be used as biocatalyst. Being in fluid contact with the second fluid, and being more hydrophobic than the unreacted enantiomer, the formed chiral ester would preferentially migrate from the source phase (which can be either the fluid one or the fluid three) to the hydrophobic second fluid. Heptane could be selected as second fluid. The contact of the second fluid with the receiving phase, which is an aqueous acidic solution, would further enhance the recovery and enrichment of the reacted enantiomer in the receiving phase while the acylating agent would partition into the second fluid.

The invention claimed is:

1. A method for converting at least one reactant into at least one reaction product and separating the at least one reactant from the at least one reaction product, the method comprising:

feeding the at least one reactant to one or more of a first fluid, a second fluid, or a third fluid contained in a vessel with a vessel inner volume into which a confinement is submerged, the confinement providing a confinement inner volume in fluid connection with the vessel inner volume, wherein the first fluid has a first density $\rho 1$ and the second fluid has a second density $\rho 2$, with $\rho 1 > \rho 2$, wherein the first fluid is at most partly miscible with the second fluid so that the first fluid forms a lower phase and the second fluid forms an upper phase in the vessel inner volume, wherein the vessel inner volume is at most partly filled with the second fluid in fluid connection with the confinement inner volume, wherein the confinement contains the third fluid with a third density $\rho 3$, wherein $\rho 3 > \rho 2$ so that the second fluid forms an upper layer and the third fluid forms a lower layer in the confinement inner volume, wherein the third fluid may be the same as or different from the first fluid, wherein at least one of the first fluid, the second fluid, and the third fluid is immiscible with the other two fluids, wherein at least one of the first fluid and the third fluid contain a fourth phase which is a solid or semi solid, said fourth phase being capable of promoting a chemical, biochemical, or biological reaction for the conversion of the at least one reactant into the at least one reaction product, wherein the at least one reactant and the at least one reaction product have a different affinity for at least two of the first fluid, the second fluid, and the third fluid.

2. The method according to claim 1, wherein at least one of the first fluid, the second fluid, or the third fluid is subjected to agitation.

3. The method according to claim 2, wherein the agitation is carried out in such a way that mass transfer between the first fluid, the second fluid, and the third fluid is promoted, while mixing of the first fluid, the second fluid, and the third fluid is reduced to a minimum.

4. The method according to claim 1, wherein the fourth phase is a catalyst, wherein said catalyst comprises a catalytically active material supported on a carrier material, or wherein said catalyst comprises an immobilized biological entity capable of said promoting the chemical, biochemical, or biological reaction for the conversion of the at least one reactant into the at least one reaction product.

5. The method according to claim 1, wherein the at least one reactant is supplied to the second fluid, wherein the at least one reactant has a reactant/first fluid compatibility that is higher than a reactant/second fluid compatibility, wherein the at least one reactant is subjected to a reaction in the first fluid to form the at least one reaction product, wherein the at least one reaction product has a product/third fluid compatibility that is higher than a product/first fluid compatibility and a product/second fluid compatibility and wherein the at least one reaction product is recovered from the third fluid.

6. The method according to claim 1, wherein the at least one reactant is supplied to the second fluid, wherein the at least one reactant has a reactant/third fluid compatibility that is higher than a reactant/second fluid compatibility, wherein the at least one reactant is subjected to a reaction in the third fluid to form the at least one reaction product, wherein the at least one reaction product has a product/first fluid compatibility that is higher than a product/second fluid compatibility and a product/third fluid compatibility and wherein the at least one reaction product is recovered from the first fluid.

7. The method according to claim 1, wherein the at least one reactant is supplied in excess.

8. The method according to claim 1, wherein the first fluid and the third fluid are at most partly miscible.

9. The method according to claim 1, wherein the fourth phase is positioned on a bottom of the vessel or a bottom of the confinement.

10. The method according to claim 9, wherein the confinement further comprises a liquid impermeable confinement wall.

11. The method according to claim 1, wherein the fourth phase is a biologically active material or a catalytically active material capable of said promoting the chemical, biochemical, or biological reaction.

12. The method according to claim 1, wherein the at least one reactant is contained in the first fluid, and one or more of the second fluid and the third fluid contain a compatibilizer for improving a product/second fluid compatibility or a product/third fluid compatibility.

13. The method according to claim 1, wherein the at least one reactant is contained in the third fluid, and the first fluid or the second fluid contains a compatibilizer for improving a product/first fluid compatibility or a product/second fluid compatibility.

14. The method according to claim 1, wherein the vessel comprises an agitator configured for agitating at least one of the first fluid, the second fluid, and the third fluid.

15. The method according to claim 14, wherein the agitator is further configured for agitating the confinement.

16. The method according to claim 15, wherein the agitator comprises a first set of rotatable impellers at a position outside of the confinement and proximal to the bottom of the confinement.

17. The method according to claim 15, wherein the agitator further comprises a second set of rotatable impellers at a position proximal to an open top face of the confinement and below an upper surface of the second fluid.

18. The method according to claim 16, wherein the first set of rotatable impellers may be agitated at the same speed as the confinement or at a different speed.

19. The method according to claim 14, wherein an agitation speed of the agitator is variable.

20. The method according to claim 1, wherein a position of the confinement in an upright direction of the vessel is variable.

21. The method according to claim 1, wherein the one or more of the first fluid, the second fluid, and the third fluid contains at least one material capable of selective trapping the at least one reactant or the at least one reaction product.

22. The method according to claim 1, wherein the confinement comprises a bottom and a peripheral wall which are liquid impermeable, and a top face which is at least partly open and capable of communicating with the vessel inner volume.

23. The method according to claim 8, wherein the first fluid and the third fluid are immiscible.

24. The method according to claim 11, wherein the fourth phase is the biologically active material comprising cells or fragments thereof.

25. The method according to claim 15, wherein the agitator is configured for agitating the confinement by rotating, rocking, wagging, or oscillating the confinement.

* * * * *